United States Patent [19]

Lloyd

[11] Patent Number: 4,820,003

[45] Date of Patent: Apr. 11, 1989

[54] WHEELED STORAGE AND DISPLAY CART

[76] Inventor: Harold C. Lloyd, 1205 Birdneck Lake Dr., Virginia Beach, Va. 23451

[21] Appl. No.: 178,608

[22] Filed: Apr. 7, 1988

[51] Int. Cl.⁴ .............................................. A47B 81/00
[52] U.S. Cl. ..................................... 312/234; 312/250
[58] Field of Search .............. 312/250, 234, 118, 287, 312/211, 290, 291; 232/43.1

[56] References Cited

U.S. PATENT DOCUMENTS

| D. 168,533 | 1/1953 | Chamberlain . | |
|---|---|---|---|
| D. 192,311 | 2/1962 | Haas . | |
| D. 236,056 | 7/1975 | Lemon . | |
| 296,767 | 4/1884 | McIntosh | 312/250 |
| 392,856 | 11/1888 | Dexter | 312/211 |
| 621,533 | 3/1899 | May | 312/291 X |
| 749,884 | 1/1904 | Saiger | 312/211 X |
| 912,168 | 2/1909 | Reese | 312/290 X |
| 2,174,068 | 9/1939 | Citron | 312/287 X |
| 2,432,455 | 7/1949 | Smith . | |
| 2,453,129 | 11/1948 | Hinton | 312/290 |
| 2,475,428 | 7/1949 | Holmgren . | |
| 2,531,444 | 11/1950 | Lane | 312/211 |
| 3,405,985 | 10/1968 | Higer . | |
| 3,445,150 | 5/1969 | Zartarian | 312/250 X |
| 4,087,144 | 5/1978 | Wax . | |
| 4,344,660 | 8/1982 | Molnar et al. | 312/250 |
| 4,699,312 | 10/1987 | Owen | 232/43.1 |
| 4,702,534 | 10/1987 | Witt et al. . | |

Primary Examiner—Joseph Falk
Attorney, Agent, or Firm—H. Jay Spiegel & Associates

[57] ABSTRACT

The present invention relates to an improved wheeled storage and display cart disclosed herein in three embodiments. In a first embodiment, the device includes a wheeled cart having two storage compartments separated by a divider and a suggestion box extending from one side to the other of the device. Mounted above the suggestion box are card holders, a pen holder and a frame designed to support a poster. A second embodiment is only about two thirds the width of the first embodiment and only has one storage compartment and one suggestion box therein. A third embodiment includes an open storage compartment on its lower portion designed to receive large items such as stacked carry baskets and also includes a separate insert which may selectively be inserted in the storage compartment to elevate the floor of the storage compartment.

13 Claims, 2 Drawing Sheets

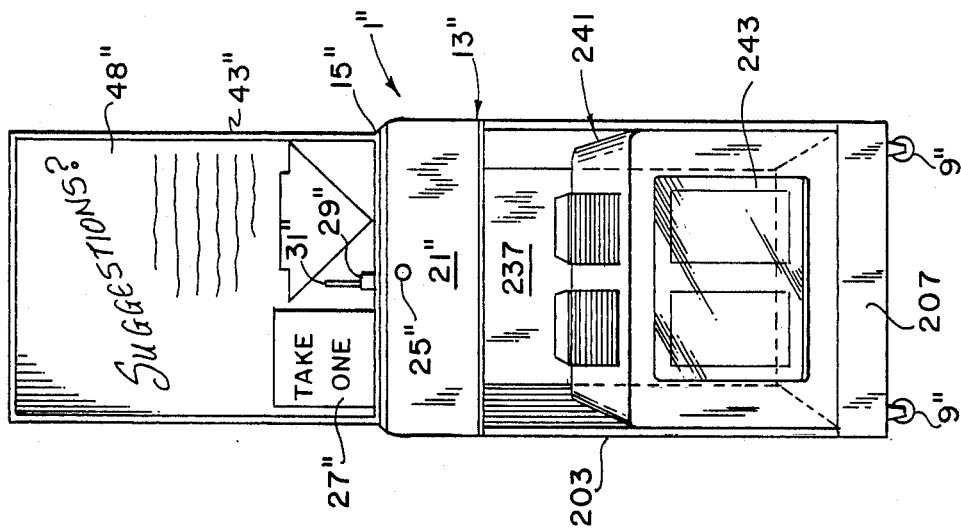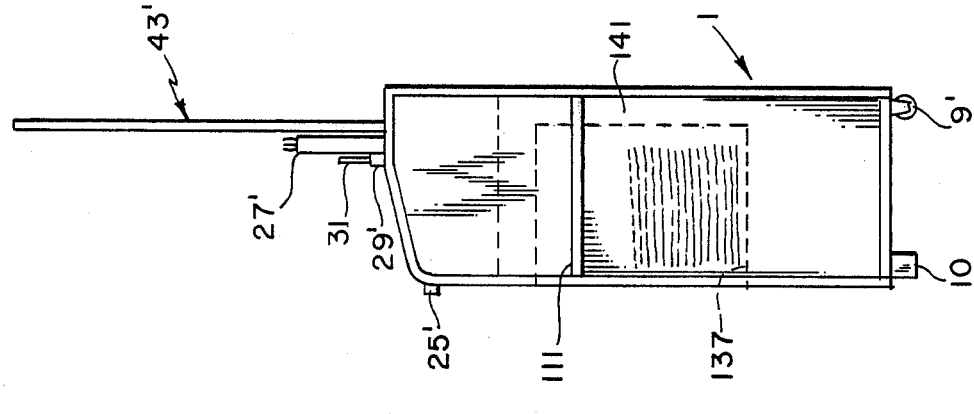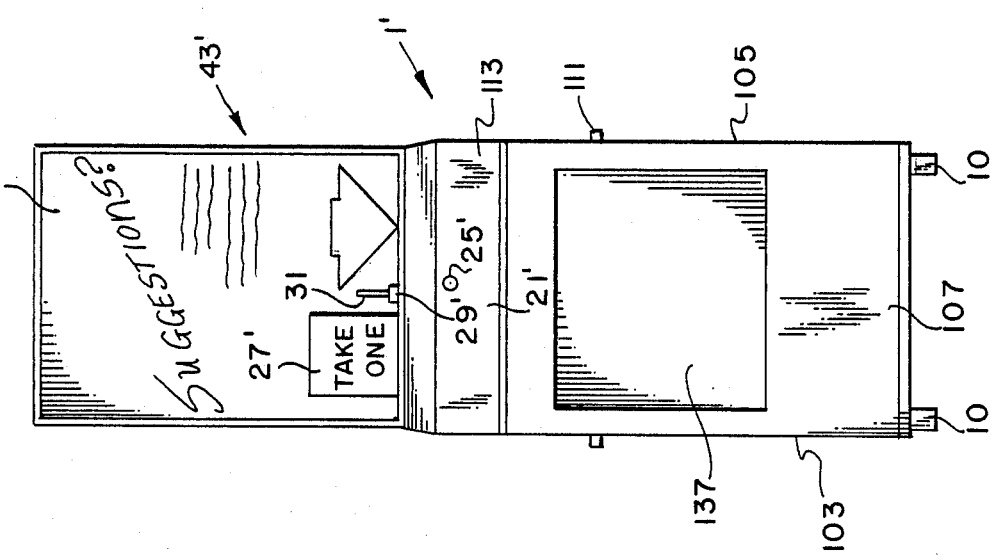

WHEELED STORAGE AND DISPLAY CART

BACKGROUND OF THE INVENTION

The present invention relates to an improved wheeled storage and display cart. Carts are well known in the prior art and are used for various purposes. The following prior art is known to applicant:

U.S. Pat. No. 2,432,455 to Smith teaches a display rack having a plurality of doors all of which may be locked by the provision of a handle having a key lock contained therein. The device is designed as a display rack, oil saver and waste can receptacle.

U.S. Pat. No. 2,475,428 to Holmgren discloses a portable teller's cage having a plurality of drawers as well as a wall with an opening therein. At least one of the drawers is accessible through a slot 65 in the counter thereof.

U.S. Pat. No. 4,087,144 to Wax discloses the concept of a portable booth including collapsible walls, wheels and shelf structure.

U.S. Pat. No. 3,405,985 to Higer discloses the concept of a stand including a lockable compartment including two chambers accessible by slots 42, 44. The device further includes structure for displaying advertising cards.

U.S. Pat. No. 4,702,534 to Witt, et al. discloses a display case including wing-like members which may be utilized to display advertising.

U.S. Pat. No. D168,533 to Chamberlain discloses the concept of a combined display case and order box which appears to include a lockable container and which further includes a pen holder. Chamberlain also appears to disclose structure for displaying advertising.

U.S. Pat. No. D192,311 to Haas discloses a combined store directory and display cabinet having advertising as well as storage.

Finally, U.S. Pat. No. D236,056 to Lemon discloses a sales console including upper and lower storage capacity.

While each of the above discussed United States patents teaches a device including some concept of storage, and while some of these devices teach the concept of a locked container even in some cases accessible by a slot, and while some of these patents disclose the display of signs on their devices, none of the devices disclosed in the patents discussed above teaches all of the aspects of the present invention. As such, it is respectfully submitted that the present invention patentably distinguishes therefrom.

SUMMARY OF THE INVENTION

The improved wheeled storage and display cart of the present invention overcomes the deficiencies found in the prior art as set forth above and provides a new and improved wheeled storage and display cart having distinct advantages over the prior art.

The present invention includes the following interrelated aspects and features:

(a) In a first embodiment of the present invention, a wheeled cart is provided including a locked suggestion box having two slots therein accessing the lockable chamber. Below the suggestion box is an elongated compartment divided into two chambers by a partition.

(b) Above the suggestion box are a pen holder, a sign holder and a pair of card holders, one mounted on each side of the sign holder.

(c) In a second embodiment of the present invention, the device is only approximately two thirds as deep, front to back, as the first mentioned embodiment. In the second embodiment, the suggestion box has only a single access slot and the sign holder is at the rear of the device. A single card holder is provided in front of the sign holder and a single pen holder is mounted adjacent the card holder. The storage compartment is a single compartment which extends all the way to the rear of the device and is open toward the front thereof.

(d) A third embodiment of the present invention consists of a modification of either of the first or second embodiments with the modification being to eliminate the compartment(s) and instead provide an open section completely open from a platform just above the wheels to just below the suggestion box with the open section being sized to receive stacked articles such as, for example, carry baskets. In this embodiment, a separate insert is provided which may selectively be inserted into the storage compartment to elevate the floor thereof.

As such, it is a first object of the present invention to provide an improved wheeled storage and display cart.

It is a further object of the present invention to provide such a device including a lockable suggestion box having at least one slot accessing the interior thereof.

It is a still further object of the present invention to provide such a cart including a pen holder, a sign holder and a card holder.

These and other objects, aspects and features of the present invention will be better understood from the following detailed description of the preferred embodiments when read in conjunction with the appended drawing figures.

BRIEF DESCRIPTION OF THE DRAWINGS

FIG. 4 shows a front view of a second embodiment of the present invention.

FIG. 5 shows a side view of the embodiment of FIG. 4.

FIG. 6 shows a front view of a further embodiment of the present invention.

SPECIFIC DESCRIPTION OF THE PREFERRED EMBODIMENTS

Figure 3:
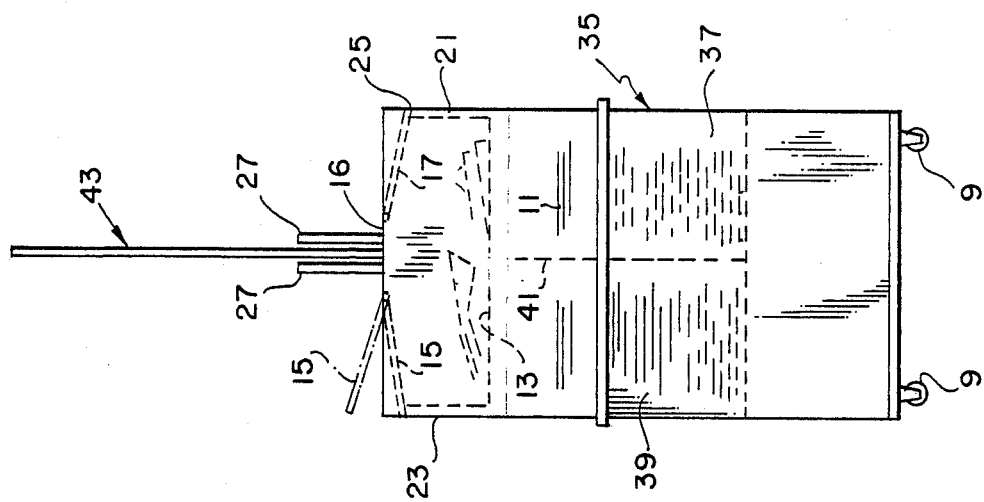
FIG. 3 shows a side view of the embodiment of FIGS. 1 and 2.
Figure 2:
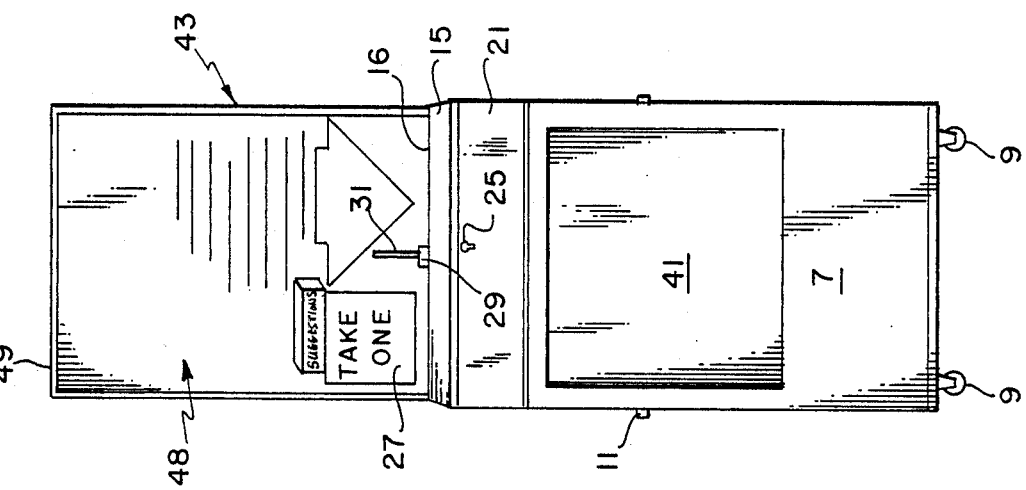
FIG. 2 shows a front view of the embodiment of FIG. 1.
Figure 1:
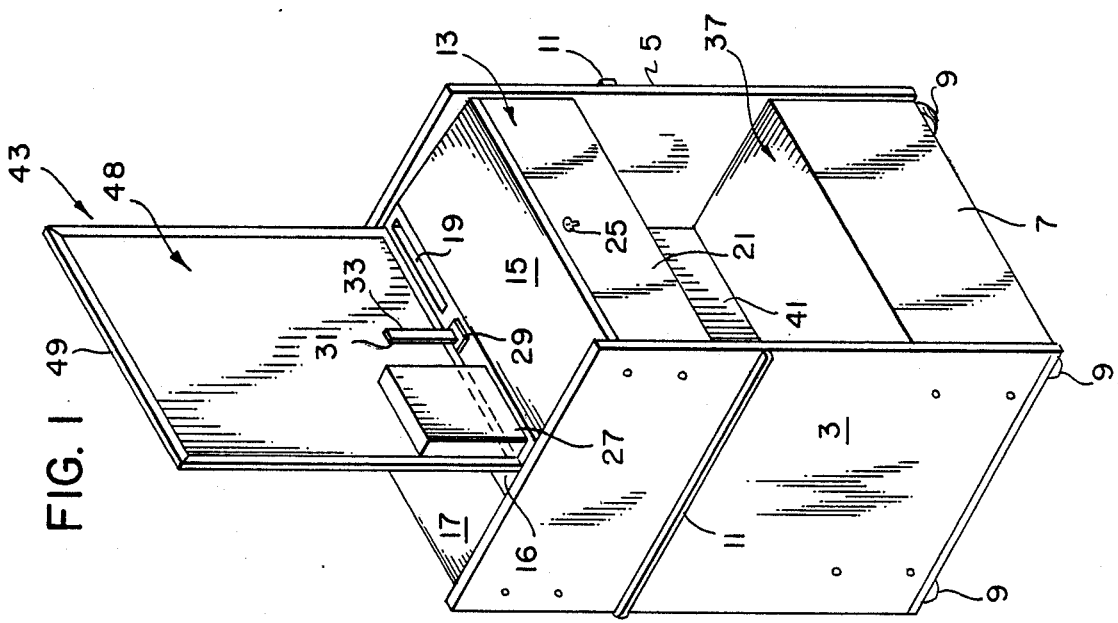
FIG. 1 shows a perspective view of a first embodiment of the present invention.

With reference first to FIGS. 1–3, the first embodiment of the inventive cart is generally designated by the reference numeral 1 and is seen to include side walls 3 and 5, a base portion 7 connecting the walls 3 and 5 and a plurality of wheels 9 mounted on the base 7. Each wall has mounted thereon a bumper guard 11 made of a heavy duty material and designed to prevent damage to the cart 1.

Between the walls 3 and 5, at an upper portion of the cart 1, a container 13 is provided which includes top sloped walls 15 and 17 separated by a flat wall 16 and has its side walls defined by the walls 3 and 5 of the cart 1. The wall 16 includes two slots 19 extending therethrough allowing users of the cart 1 to insert papers, suggestions or other items into the container 13. The container 13 includes a front wall 21 and a rear wall 23. Each of which walls 15 and 17 is hingedly mounted on the cart 1 and each may be locked by a suitable locking device 25.

As seen in FIG. 3 in particular, the top surfaces 15 and 17 are sloped to best facilitate using them as writing surfaces.

As seen in FIGS. 1-3, the surface 16 has mounted thereon a transparent card holder 27 which includes an open top portion and a forward facing open slot with this card holder being designed to receive cards such as suggestion cards which may be easily removed therefrom, filled out and then inserted in one of the slots 9. As seen in FIGS. 1 and 2, a pen holder 29 may be provided including a hole therein designed to receive a pen attached thereto by virtue of attachment means 33 such as a cable, chain, coiled member or the like.

With further reference to FIG. 3, it is seen that below the container 13 and above the base portion 7 a compartment section 35 is provided including two compartments 37 and 39 separated by a partition 41. These compartments are provided to allow storage of such items as advertising circulars, brochures or other desired articles. Furthermore, centrally located on the top of the cart 1 is a frame 43 including upright arms 45, 47 as well as an upper portion 49. The frame 43 is provided to allow the support of a removable sign which may be selectively inserted and removed from the stand 43 for display purposes. The sign is generally designated by the reference numeral 48. In the preferred embodiment of the present invention, the frame 43 is made with grooves sufficiently wide enough to allow a sign as well as forward and rearward plastic covering members to be inserted therein. If desired, the top portion 49 of the frame 43 may include a slot extending completely therethrough allowing a sign with covering portions to be slid completely therethrough and into rails formed in the arms 45 and 47.

Reference is now made to FIGS. 4 and 5 wherein a second embodiment of the present invention is illustrated, with like elements being designated by like primed reference numerals.

The cart 1' has walls 103 and 105 which are preferably of about two-thirds the depth of the walls 3 and 5 since the cart 1' is about half the depth of the cart 1. The cart 1' also includes a base portion 107 between the walls 103 and 105 and has the further provision of bumper guards 111. Wheels 9' and legs 10 are provided on the base 107. A single, forward facing storage compartment 137 is provided above the base portion 107 and includes a rear wall 141 defining the rear of the cart 1'. Above the storage compartment 137 is a container 113 having a wall 21', and surface 15' may be selectively pivoted when not locked by virtue of a locking mechanism 25'. Top surface 16' has a slot 19' therein to allow suggestions or other papers to be inserted therethrough.

As also seen in FIGS. 4 and 5, the cart 1' includes a frame 43' adapted to removably receive an advertising sign 48'. As best seen in FIG. 5, the frame 43' is mounted on the surface 15' close to the rearmost portion thereof.

With reference now to FIG. 6, where like elements are designated by like double primed reference numerals, a cart 1" is seen to include a base portion 207, wheels 9", side walls 203 and 205 as well as a container 13" including a front wall 21" and pivotable surface 15" lockable by a lock 25". A top surface 16" of the container 13" has mounted thereon a frame 43" designed to removably receive an advertising sign 48", a card holder 27" preferably made of plastic and a pen holder 29" designed to receive a pen 31".

The cart 1" is different from the carts 1 and 1' as including an open portion 237 which extends from the base 207 to the storage compartment 13" and is completely open all the way therethrough, extending upwardly a greater distance than the upward extent of either of the compartments 37, 39 or 137. The opening 237 is provided of a sufficient size to allow stacking of articles therein such as, for example, carry baskets of the type which are used in supermarkets.

An insert 241 may selectively be inserted in the opening 237 to raise its floor level to approximately the configuration and size of the compartment 37 or 39. The insert may include a transparent front 243 allowing display of, for example, the item(s) placed in the opening 237. The front 243 may include a Plexiglas ® cover.

In the above described embodiments of the present invention, the wheels 9, 9', 9" may, if desired, be heavy duty, lockable wheels with the lockable feature enabling the cart to be rolled to a desired location and then to be locked in position there. Of course, the use of legs 10 having resilient frictional ends precludes the necessity for such lockable feature. Further, legs 10 may be provided in any of the embodiments disclosed.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:
1. An improved storage and display cart, comprising:
   (a) a base portion having an underside with a plurality of wheels mounted thereon;
   (b) a plurality of walls extending upwardly from said base portion;
   (c) a container partially defined by said walls at an upper portion thereof, said container having a generally flat first top surface and a side wall formed by a portion of one of said walls, said first top surface being pivotably mounted and having a lockable latch;
   (d) a second top surface fixedly mounted between said walls adjacent said first top surface and a card holder mounted on said second top surface;
   (e) a frame mounted on said second top surface and adapted to removably receive one of a plurality of signs;
   (f) a writing instrument holder mounted on said second top surface; and
   (g) storage means between said container and said base portion.

2. The invention of claim 1, wherein said storage means comprises a single compartment.

3. The invention of claim 2, wherein said single compartment extends completely through said cart.

4. The invention of claim 3, further including an insert selectively insertable into said single compartment having a top surface thereby becoming a floor of said compartment and having a transparent front surface adapted to display items stored in said compartment.

5. The invention of claim 2, wherein said single compartment includes a rear wall defining a rearward extent thereof.

6. The invention of claim 1, wherein said storage means comprises two compartments separated by a vertical partition.

7. The invention of claim 1, wherein a writing instrument mountable in said writing instrument holder comprises a pen.

8. The invention of claim 1, further including a bumper guard mounted on each of said walls.

9. The invention of claim 1, wherein said second top surface has a slot extending therethrough allowing objects to be inserted into said container.

10. The invention of claim 1, wherein said second top surface has a plurality of slots extending therethrough allowing objects to be inserted into said container.

11. The invention of claim 10, wherein said slots comprise a slot on each side of said frame.

12. The invention of claim 1, wherein said lockable latch comprises a key operated rotary latch.

13. The invention of claim 1, wherein said wheels are two in number and further including two legs mounted on said base portion.

* * * * *